Patented Aug. 25, 1953

2,650,238

UNITED STATES PATENT OFFICE 2,650,238

PREPARATION OF AROMATIC MERCURY HALIDES

Otto Daněk and Jaroslav Nosek, Pardubice-Rybitvi, Czechoslovakia, assignors to Vychodoceske Chemicke Zavody, narodni podnik, Pardubice, Czechoslovakia No Drawing. Application March 9, 1951, Serial No. 214,851. In Czechoslovakia February 19, 1947

17 Claims. (Cl. 260—433)

The present invention relates to the manufacture of aromatic mercury halides having the general formula: RHgY, wherein R represents an aryl or a substituted aryl group, and Y represents a halide radical.

The present application is a continuation-in-part of our co-pending application filed October 1, 1947 having the Serial No. 777,364, now abandoned.

A prior art method for the manufacture of phenyl mercury chloride has been described by Nesmajanov in Berichte 62, 1015, wherein a solution of benzene diazonium chloride (diazotized aniline) is introduced with a solution of mercury chloride into dilute hydrochloric acid whereby a double salt is formed which is filtered with suction. This double salt is then introduced into acetone and decomposed by means of two equivalents of powdered copper (two gram-atoms copper to 1 gram-molecule of double compound), and the phenyl mercury chloride formed is extracted with acetone to separate it from the insoluble cuprous chloride also formed during the reaction. The yield obtained by Nesmajanov's process is 51% of the theoretical yield. The reaction proceeeds in accordance with the following equations wherein R represents an aryl group.

1. $RN_2Cl + HgCl_2 \rightarrow RN_2Cl.HgCl_2$
2. $RN_2Cl.HgCl_2 + 2Cu \rightarrow RHgCl + Cu_2Cl_2 + N_2$ Such prior art methods of producing aromatic mercury halides obviously involve great expense in the use of costly organic solvents and large amounts of copper. Another disadvantage of the prior art methods is the necessity of separating the intermediate product, namely the double salt, from the reaction mixture prior to proceeding with the decomposition step which produces the aryl mercury halide.

Applicants have simplified this involved, time consuming and costly procedure by the use of a continuous and uninterrupted method of producing said aryl mercury halides. Another improvement of the instant invention over the prior art methods is the considerably increased yield obtained hereby. The sum total of the above mentioned and other advantages results in a superior commercial process particularly suitable for mass production of the aryl mercury halides which are useful in the elimination of fungi and molds and as seed immunizing agents. Furthermore, the resultant products of this invention exhibit a particularly low solubility in water rendering them considerably more economical in use, said products maintaining their therapeutic activity over a longer period of time.

Accordingly, an object of the present invention is the development of a new process for the production of a high yield of aryl mercury halides.

Another object of this invention is the development of a superior commercial process of manufacturing aryl mercury halides.

A further object of this invention is the development of a continuous and uninterrupted method of producing aryl or substituted aryl mercury halides.

A further object of this invention is the development of a simplified process of producing aryl mercury halides.

Further objects and advantages of the present invention will be apparent from the following description.

It has now been discovered that aromatic mercury halides may be prepared in a continuous manner by diazotizing an aromatic amine in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble aromatic mercury halide and water-soluble cupric halide are formed in accordance with the following reaction:

$RN_2Y.HgY_2 + Cu \rightarrow RHgY_2 + N_2 + CuY_2$ where R represents an aromatic radical and Y represents a halide, and recovering a substantially pure aromatic mercury halide.

It has also been discovered that the decomposition reaction is an ionic reaction and can thus be carried out in an aqueous medium or in the presence of organic water-miscible solvents or mixtures of water and organic water miscible solvents. Furthermore, only two electro-positive valences are necessary for the decomposition of the diazonium double salt. Consequently, one molecule of double salt requires one atom of a divalent metal such as zinc, tin or copper. The metal is preferably used in powdered form. The use of zinc or tin effects a small yield, generally only about 10% of the theoretical yield, whereas copper produces yields of up to about 86% of the theoretical yield. Accordingly, copper, copper bronze or molecular copper produced by the precipitation from cuprous salt solutions, in powdered form is utilized in the present invention. The decomposition reaction proceeds, in general, according to the following equation:

3. $XRN_2Y.HgY_2 + Me \rightarrow XRHgY + MeY_2 + N_2$ wherein X represents any of the following substituents: H, $CH_3$, $C_2H_5OH$, $OCH_3$, $OC_2H_5$, Cl, Br, I, F, NO₂, COOH, R represents an aryl group, Y represents a halogen such as Cl, Br, I, and Me represents a divalent metal such as Zn, Sn, and Cu.

Thus an essential feature of the instant invention resides in the utilization of only one equivalent of metallic copper whose electro-positive potential or divalency is completely utilized in the formation of water soluble cupric chloride or halide in the decomposition reaction, as clearly illustrated by the above chemical reaction (Equation No. 3). This effects a saving of one half of the amount of copper previously used as well as eliminates the prior art step of separating the insoluble cuprous chloride, $Cu_2Cl_2$, from the insoluble aryl mercury chloride, RHgCl, by extraction with acetone, since water soluble cupric chloride, $CuCl_2$, is formed in the instant process from which the insoluble aromatic mercury halide can be separated with facility.

Another important feature of the present process is the use of an aqueous medium for the decomposition reaction. This eliminates the use of expensive solvents heretofore utilized. Organic solvents miscible with water, such as acetone, methanol, ethanol and the like, may be added to the aqueous medium if a product of a higher degree of purity is desired. A mixture of water and organic water-miscible solvent may be advantageously used if a chemically pure product is desired. A small quantity of certain impurities which normally would be precipitated with the resultant product in an aqueous medium is eliminated from said product in an aqueous organic medium due to the solubility of said impurities in a mixture of water and organic solvent.

Another feature of the instant process is the use of an acidic medium for the decomposition reaction of the double diazonium salt. A neutral medium may also be utilized but it has been found that in an acidic medium, such as hydrochloric acid, the reaction proceeds in a more favorable manner.

A further essential feature of the present process is the maintenance of temperatures of about 5–10° C. during the decomposition reaction, such as by the addition of ice to the reaction mixture.

The initial diazotizing reaction also occurs at temperatures of about 0–5° C. by simultaneously cooling the reaction mixture during the formation of the diazonium compound (e. g. $RN_2Cl$). The diazonium compound is prepared by the known method of diazotizing an aromatic amine with sodium nitrite or the like in the presence of hydrochloric acid or its equivalent.

A particular embodiment of this invention is the production of the diazonium double salt with mercury halide by diazotizing aromatic amine in the presence of mercury halide, the medium used herein being preferably an acidified aqueous medium. An aqueous medium containing water miscible organic solvents may also be utilized, if an unusually pure end product is desired. To this reaction mixture which contains the double salt, metallic copper or similar copper product is added, thereby producing the aromatic mercury halide in the original acidified aqueous medium. Thus, it is apparent that a continuous method of producing an aromatic mercury halide has been developed starting with an aromatic amine, which does not require the separation of any intermediate products for the successful completion of the entire reaction. Consequently, both the diazotizing reaction and the decomposition reaction can be carried out in the same medium which is an acidified aqueous solution to which may be added an organic water miscible solvent.

The aryl-mercury bromide or iodide can be prepared by the same procedure as the chloride as represented by Equation No. 3. However, it is not necessary to employ an exclusively bromide or iodide medium. The decomposition of the double diazonium mercury chloride salt may be carried out in a chloride medium such as hydrochloric acid in the presence of only one equivalent of a different soluble metallic halide such as the alkali metal bromide or iodide. The bromide and iodide ions are more reactive than the chloride ion and consequently replace the chloride to form the corresponding aryl-mercury bromide or iodide, which results in a more insoluble halide of an aromatic mercury compound. The reaction proceeds in accordance with the following formula, wherein Y represents Br or I, and Me represents Na or K:

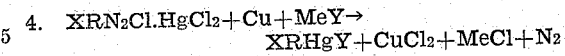

4. $XRN_2Cl.HgCl_2 + Cu + MeY \rightarrow$
$XRHgY + CuCl_2 + MeCl + N_2$

Among the substantial advantages of the present invention is the fact that the decomposition reaction is carried out in an acidified aqueous medium with the employment of only half the amount of copper heretofore required. According to prior art methods, it was necessary to use for the decomposition reaction two equivalents of copper, which was transformed into insoluble cuprous chloride, $Cu_2Cl_2$, resulting in a water insoluble mixture of cuprous chloride and phenyl mercury chloride, and necessitating the extraction of the latter with acetone. It is a particular advantage of the present process that the entire course of reaction is carried out in a single phase without isolating any of the intermediate products. Only the resultant crystalline products, the aryl mercury halide, is isolated, after the total amount of copper used for the decomposition reaction has been dissolved in the aqueous medium in the form of a soluble chloride or other cupric halide.

This new process for the preparation of aryl mercury halides and similar compounds according to the present invention represents a considerable technical advance as compared with the methods heretofore known, and may be used as a preferred commercial process for mass production. The advantages of the process according to this invention as compared with previous processes are simplification, a saving of half the amount of copper for the decomposition reaction of the double diazonium salt, while the expensive organic solvents for the extraction of the product may be entirely dispensed with, and the yield is far higher.

The following examples are additionally illustrative of the present invention and are not to be construed as limiting the scope thereof.

*Example I*

136 kgs. of mercuric chloride are dissolved in 200 litres of hydrochloric acid having a specific gravity of 1.17, into which 46.5 kgs. of aniline are gradually introduced. The mixture is cooled by the addition of 300 kgs. of ice, and diazotized with 35.0 kgs. of sodium nitrite at a temperature not exceeding 5° C. The thick crystalline paste-like double compound obtained of benzene diazonium chloride and mercuric chloride is decomposed with 31.8 kgs. of copper bronze at a temperature of 5–10° C., in the medium in which it was produced by merely adding the copper bronze powder thereto. The insoluble raw phenyl mercury chloride, C₆H₅HgCl, precipitated out and is filtered with suction, washed with water and dried. The yield of the refined product amounts to 135 kgs., which represents a yield of 86.6% of the theoretical amount. The melting point of C₆H₅HgCl is about 250° C. The mother liquid contains soluble cupric chloride, CuCl₂, which represents the total conversion of the metallic copper.

*Example II*

136 kgs. of mercuric chloride are dissolved in a mixture of 200 litres of hydrochloric acid having a sp. gr. of 1.17, and 600 litres of acetone, to which 71.5 kgs. of betanaphthylamine are gradually added. The mixture is cooled with 400 kgs. of broken ice and diazotized with 35.0 kgs. of sodium nitrite at a temperature not exceeding 5° C. The produced thick crystalline paste of a double compound of beta-naphthalene diazonium chloride with mercury chloride is immediately decomposed in the mother liquor, without isolation therefrom by the admixture of 31.8 kgs. of copper, in powder form, at a temperature of 5–10 C. The produced insoluble raw beta mercury naphthyl chloride, C₁₀H₇HgCl, is removed by suction, washed with water and dried. The yield of the technically pure product amounts to 111 kgs. or 61.5% of the theoretical yield.

*Example III*

180 kgs. of mercury bromide are dissolved in 260 litres of hydrobromic acid having a density of 1.377, to which 53.5 kgs. of p-toluidine are gradually added. The mixture is cooled by the introduction of 350 kgs. of ice broken into pieces the size of a fist, and diazotized by means of 35.0 kgs. of sodium nitrite at a temperature not exceeding 5° C. The produced thick crystalline paste of the double compound of p-toluene-diazonium-bromide with mercury bromide is decomposed, in this same medium, without isolation therefrom by means of 31.8 kgs. of copper bronze at a temperature of 5–10° C. by the subsequent addition of 150 kgs. of ice. The thusly formed insoluble raw mercury p-tolyl-bromide, CH₃C₆H₄HgBr, is removed from the mother liquor by suction, washed with water and dried. The yield of the technically pure product amounts to 132 kgs. which is 71.7% of theoretical yield. The melting point of CH₃C₆H₄HgBr is 233° C. The total copper used in the decomposition reaction is converted into soluble cupric bromide, CuBr₂, which remains dissolved in the mother liquor.

*Example IV*

136 kgs. of mercury chloride, and 69 kgs. of crystalline sodium bromide are dissolved in 200 litres of hydrochloric acid having a density of 1.17 to which 46.5 kgs. of aniline are gradually added. The mixture is cooled by the addition of 300 kgs. of ice and diazotized by means of 35.0 sodium nitrite at a temperature not exceeding 5° C. The produced crystalline paste of the double compound of benzene-diazonium chloride with mercury chloride is decomposed in this same medium (in the same vessel) by the addition of 31.8 kgs. of copper in powder form at a temperature not exceeding 5° C., an additional amount of ice is added if necessary to maintain the temperature at a maximum of 5° C. The produced insoluble raw phenyl mercury bromide, C₆H₅HgBr, is removed by suction, washed with water and dried. The yield of the refined technical product amounts to 150 kgs. or 85% of the theoretical yield.

It will be understood that each of the elements described above, or two or more together, may also find a useful application in other types of method of manufacturing halide differing from the types described above.

While we have illustrated and described the invention as embodied in methods of manufacturing aromatic mercury halides, we do not intend to be limited to the details shown, since various modifications and structural changes may be made without departing in any way from the spirit of our invention.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What we claim as new and desire to secure by Letters Patent is:

1. A commercial method of manufacturing an aromatic mercury halide which comprises diazotizing an aryl amine in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble aryl mercury halide and water-soluble cupric halide are formed in accordance with the following reaction:

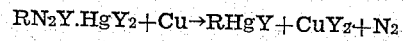

$$RN_2Y.HgY_2 + Cu \rightarrow RHgY + CuY_2 + N_2$$

wherein R represents an aryl radical and Y represents a halide, and recovering a substantially pure aryl mercury halide.

2. A commercial method of manufacturing an aromatic mercury halide which comprises diazotizing a substituted aryl amine, said substituent being selected from the group consisting of CH₃, C₂H₅, OH, OCH₃, OC₂H₅, Cl, Br, I, F, NO₂ and COOH, in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble substituted aryl mercury halide and water-soluble cupric halide are formed in accordance with the following reaction:

$$RN_2Y.HgY_2 + Cu \rightarrow RHgY + CuY_2 + N_2$$

wherein R represents a substituted aryl radical and Y represents a halide, and recovering a substantially pure substituted aryl mercury halide.

3. A commercial method of manufacturing an aromatic mercury halide which comprises diazotizing an aromatic amine in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble aromatic mercury halide and water-soluble cupric halide are formed in accordance with the following reaction:

$$RN_2Y.HgY_2 + Cu \rightarrow RHgY + CuY_2 + N_2$$

wherein R represents an aromatic radical and Y represents a halide, and recovering a substantially pure aromatic mercury halide.

4. A commercial method of manufacturing an aromatic mercury halide which comprises diazotizing an aromatic amine in the presence of a mercury halide in an acidic aqueous medium containing a water miscible organic solvent at a temperature of about 0–5° C., whereby the diazonium double salt containing a mercury handle is formed, decomposing said double salt at a temperature of about 5–10° C. by adding one equivalent of metallic copper to the reaction mixture whereby the water insoluble aromatic mercury halide and water-soluble cupric halide are formed in accordance with the following reaction:

$$RN_2Y.HgY_2 + Cu \rightarrow RHgY + CuY_2 + N_2$$

wherein R represents an aromatic radical and Y represents a halide, and recovering a substantially pure aromatic mercury halide.

5. A commercial method of manufacturing an aromatic mercury halide which comprises diazotizing an aryl amine in the presence of a mercury halide in an acidic aqueous medium containing a water miscible organic solvent at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble aryl mercury halide and water-soluble cupric halide are formed in accordance with the following reaction:

$$RN_2Y.HgY_2 + Cu \rightarrow RHgY + CuY_2 + N_2$$

wherein R represents an aryl radical and Y represents a halide, and recovering a substantially pure aryl mercury halide.

6. A commercial method of manufacturing an aromatic mercury halide which comprises diazotizing a substituted aryl amine, said substituent being selected from the group consisting of $CH_3$, $C_2H_5$, OH, $OCH_3$, $OC_2H_5$, Cl, Br, I, F, $NO_2$ and COOH, in the presence of a mercury halide in an acidic aqueous medium containing a water miscible organic solvent at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble substituted aryl mercury halide and water-soluble cupric halide are formed in accordance with the following reaction:

$$RN_2Y.HgY_2 + Cu \rightarrow RHgY + CuY_2 + N_2$$

wherein R represents a substituted aryl radical and Y represents a halide, and recovering a substantially pure substituted aryl mercury halide.

7. A commercial method of manufacturing an aromatic mercury halide which comprises diazotizing an aromatic amine in the presence of a mercury halide in an acidic aqueous medium at a temperature of about 0–5° C., whereby the diazonium double salt containing a mercury halide is formed, decomposing said double salt in the presence of one equivalent of a soluble halide salt, said halide being different from the halide in the double salt, at a temperature of about 5–10° C. by adding one equivalent of metallic copper to the reaction mixture whereby the water insoluble aromatic mercury halide and water-soluble cupric halide are formed, and recovering a substantially pure aromatic mercury halide.

8. A commercial method of manufacturing an aromatic mercury halide which comprises diazotizing an aryl amine in the presence of a mercury halide in an acidic aqueous medium at a temperature of about 0–5° C., whereby the diazonium double salt containing a mercury halide is formed, decomposing said double salt in the presence of one equivalent of a soluble halide salt, said halide being different from the halide in the double salt, at a temperature of about 5–10° C. by adding one equivalent of metallic copper to the reaction mixture whereby the water insoluble aryl mercury halide and water-soluble cupric halide are formed, and recovering a substantially pure aryl mercury halide.

9. A commercial method of manufacturing an aromatic mercury halide which comprises diazotizing a substituted aryl amine, said substituent being selected from the group consisting of $CH_3$, $C_2H_5$, OH, $OCH_3$, $OC_2H_5$, Cl, Br, I, F, $NO_2$ and COOH, in the presence of a mercury halide in an acidic aqueous medium at a temperature of about 0–5° C., whereby the diazonium double salt containing a mercury halide is formed, decomposing said double salt in the presence of one equivalent of a soluble halide salt, said halide being different from the halide in the double salt, at a temperature of about 5–10° C. by adding one equivalent of metallic copper to the reaction mixture whereby the water insoluble substituted aryl mercury halide and water-soluble cupric halide are formed, and recovering a substantially pure substituted aryl mercury halide.

10. A commercial method of manufacturing an aromatic mercury halide which comprises diazotizing an aromatic amine in the presence of a mercury halide in an acidic aqueous medium containing a water miscible organic solvent at a temperature of about 0–5° C., whereby the diazonium double salt containing a mercury halide is formed, decomposing said double salt in the presence of one equivalent of a soluble halide salt, said halide being different from the halide in the double salt, at a temperature of about 5–10° C. by adding one equivalent of metallic copper to the reaction mixture whereby the water insoluble aromatic mercury halide and water-soluble cupric halide are formed, and recovering a substantially pure aromatic mercury halide.

11. A commercial method of manufacturing an aromatic mercury halide which comprises diazotizing an aryl amine in the presence of a mercury halide in an acidic aqueous medium at a temperature of about 0.5° C., whereby the diazonium double salt containing a mercury halide is formed, decomposing said double salt at a temperature of about 5–10° C. by adding one equivalent of powdered copper to the reaction mixture whereby the water insoluble aryl mercury halide and water-soluble cupric halide are formed in accordance with the following reaction:

$$RN_2Y.HgY_2 + Cu \rightarrow RHgY + CuY_2 + N_2$$

wherein R represents an aryl radical and Y represents a halide, and recovering a substantially pure aryl mercury halide.

12. A commercial method of manufacturing an aromatic mercury halide which comprises diazotizing a substituted aryl amine, said substituent being selected from the group consisting of $CH_3$, $C_2H_5$, $OH$, $OCH_3$, $OC_2H_5$, $Cl$, $Br$, $I$, $F$, $NO_2$ and $COOH$, in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of powdered copper to the reaction mixture whereby the water insoluble substituted aryl mercury halide and water-soluble cupric halide are formed in accordance with the following reaction:

$$RN_2Y.HgY_2 + Cu \rightarrow RHgY + CuY_2 + N_2$$

wherein R represents a substituted aryl radical and Y represents a halide, and recovering a substantially pure substituted aryl mercury halide.

13. A commercial method of manufacturing an aromatic mercury halide which comprises diazotizing an aromatic amine in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of powdered copper to the reaction mixture whereby the water insoluble aromatic mercury halide and water-soluble cupric halide are formed in accordance with the following reaction:

$$RN_2Y.HgY_2 + Cu \rightarrow RHgY + CuY_2 + N_2$$

wherein R represents an aromatic radical and Y represents a halide, and recovering a substantially pure aromatic mercury halide.

14. A commercial method of manufacturing an aromatic mercury halide which comprises diazotizing an aryl amine in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble aryl mercury halide and water-soluble cupric halide are formed in accordance with the following reaction:

$$RN_2Y.HgY_2 + Cu \rightarrow RHgY + CuY_2 + N$$

wherein R represents an aryl radical and Y represents a halide, separating the insoluble aryl mercury halide from the aqueous medium and recoverying a substantially pure aryl mercury halide.

15. A commercial method of manufacturing an aromatic mercury halide which comprises diazotizing a substituted aryl amine, said substitutent being selected from the group consisting of $CH_3$, $C_2H_5$, $OH$, $OCH_3$, $OC_2H_5$, $Cl$, $Br$, $I$, $F$, $NO_2$ and $COOH$, in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble substituted aryl mercury halide and water-soluble cupric halide are formed in accordance with the following reaction:

$$RN_2Y.HgY_2 + Cu \rightarrow RHgY + CuY_2 + N_2$$

wherein R represents a substituted aryl radical and Y represents a halide, separating the insoluble aryl mercury halide from the aqueous medium and recovering a substantially pure substituted aryl mercury halide.

16. A commercial method of manufacturing an aromatic mercury halide which comprises diazotizing an aromatic amine in the presence of a mercury halide in an acidic aqueous medium at a temperature of about 0–5° C., whereby the diazonium double salt containing a mercury halide is formed, decomposing said double salt at a temperature of about 5–10° C. by adding one equivalent of metallic copper to the reaction mixture whereby the water insoluble aromatic mercury halide and water-soluble cupric halide are formed in accordance with the following reaction:

$$RN_2Y.HgY_2 + Cu \rightarrow RHgY + CuY_2 + N_2$$

wherein R represents an aromatic radical and Y represents a halide, separating the insoluble aromatic mercury halide from the aqueous medium and recovering a substantially pure aromatic mercury halide.

17. A commercial method of manufacturing an aromatic mercury halide which comprises diazotizing an aryl amine in the presence of mercury chloride in an acidic aqueous medium at a temperature of about 0–5° C., whereby the diazonium double salt containing mercury chloride is formed, decomposing said double salt in the presence of an equivalent amount of a soluble halide salt selected from the class consisting of NaBr, NaI, KBr, and KI, at a temperature of about 5–10° C., by adding one equivalent of metallic copper to the reaction mixture, whereby the water insoluble aryl mercury chloride and water-soluble cupric halide are formed, and recovering a substantially pure aryl mercury halide.

OTTO DANĚK.
JAROSLAV NOSEK.

References Cited in the file of this patent

Nesmejanow: Ber., vol. 62 (1929), pp. 1010–18.
Nesmejanow: Ber., vol. 67 (1934), pp. 130–134.
Nesmejanow: Chem. Centralblatt, 1935, II, 3899.
Nesmejanow et al.: Ber., vol. 68b, 1935, pp. 1877–1883.
Handbook of Chemistry and Physics, 14th edition, page 214, Chemical Rubber Publishing Co., Cleveland, Ohio.